(12) United States Patent
Park

(10) Patent No.: US 10,560,021 B2
(45) Date of Patent: Feb. 11, 2020

(54) DC-DC CONVERTER AND DISPLAY APPARATUS HAVING THE SAME

(71) Applicant: Samsung Display Co., Ltd., Yongin-si, Gyeonggi-do (KR)

(72) Inventor: Sung-Chun Park, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 227 days.

(21) Appl. No.: 15/411,838

(22) Filed: Jan. 20, 2017

(65) Prior Publication Data

US 2017/0250605 A1 Aug. 31, 2017

(30) Foreign Application Priority Data

Feb. 26, 2016 (KR) ........................ 10-2016-0023743

(51) Int. Cl.
*H02M 3/158* (2006.01)
*G09G 3/3266* (2016.01)
*G09G 3/3275* (2016.01)

(52) U.S. Cl.
CPC .......... *H02M 3/158* (2013.01); *G09G 3/3266* (2013.01); *G09G 3/3275* (2013.01); *G09G 2310/08* (2013.01); *G09G 2330/021* (2013.01)

(58) Field of Classification Search
CPC .......................................... H02M 3/155–1588
See application file for complete search history.

(56) References Cited

U.S. PATENT DOCUMENTS

| 6,396,252 | B1* | 5/2002 | Culpepper | H02M 3/156 323/225 |
| 6,420,858 | B1* | 7/2002 | Kitagawa | H02M 3/1588 323/282 |
| 8,604,767 | B2* | 12/2013 | Liu | H02M 3/156 323/284 |
| 8,803,769 | B2* | 8/2014 | Park | H02M 3/1588 307/31 |
| 2006/0268974 | A1* | 11/2006 | Chu | H02M 3/156 375/238 |
| 2007/0253229 | A1* | 11/2007 | Dowlatabadi | H02M 1/36 363/49 |
| 2009/0153127 | A1* | 6/2009 | Chen | H02M 3/1588 323/350 |
| 2010/0026256 | A1* | 2/2010 | Liu | H02M 3/158 323/282 |

(Continued)

FOREIGN PATENT DOCUMENTS

CN 104821715 A 8/2015

OTHER PUBLICATIONS

EPO Extended Search Report dated Sep. 7, 2017, for corresponding European Patent Application No. 17158196.0 (8 pages).

*Primary Examiner* — Yusef A Ahmed
(74) *Attorney, Agent, or Firm* — Lewis Roca Rothgerber Christie LLP

(57) ABSTRACT

A DC-DC converter includes: a first switch; a second switch connected to the first switch; a mode selecting circuit to select a converting mode from one of at least a first mode and a second mode based on an input voltage; and a controller to generate a first switching control signal for controlling the first switch based on the converting mode, and a second switching control signal for controlling the second switch based on the converting mode.

8 Claims, 16 Drawing Sheets

(56) References Cited

U.S. PATENT DOCUMENTS

| | | | |
|---|---|---|---|
| 2010/0148741 A1* | 6/2010 | Chen | H02M 3/158 323/285 |
| 2011/0018514 A1* | 1/2011 | Chen | H02M 3/1588 323/283 |
| 2013/0063100 A1* | 3/2013 | Henzler | H02M 3/156 323/234 |
| 2014/0320104 A1* | 10/2014 | Guo | H02M 1/14 323/290 |
| 2015/0028825 A1* | 1/2015 | Mao | H02M 3/157 323/234 |
| 2015/0061540 A1* | 3/2015 | Park | H05B 33/0896 315/294 |
| 2015/0303803 A1* | 10/2015 | Chen | H02M 3/158 323/271 |
| 2015/0349646 A1* | 12/2015 | Karlsson | H02M 3/33576 363/21.01 |
| 2016/0111955 A1* | 4/2016 | Hwang | H02M 3/156 323/235 |
| 2016/0140912 A1* | 5/2016 | Im | G09G 3/003 345/690 |
| 2016/0164411 A1* | 6/2016 | Chen | H02M 3/1582 323/271 |
| 2016/0254689 A1* | 9/2016 | Lee | H02M 3/158 320/107 |
| 2016/0299521 A1* | 10/2016 | Akram | H02M 3/07 |
| 2016/0315535 A1* | 10/2016 | Ouyang | H02M 3/1582 |
| 2016/0329734 A1* | 11/2016 | Lee | H02M 3/156 |
| 2017/0012529 A1* | 1/2017 | Yamada | H02M 3/158 |
| 2017/0243530 A1* | 8/2017 | Kwon | G09G 3/2092 |
| 2017/0269679 A1* | 9/2017 | Atkinson | G06F 1/26 |
| 2017/0325307 A1* | 11/2017 | Lee | H05B 33/083 |

* cited by examiner

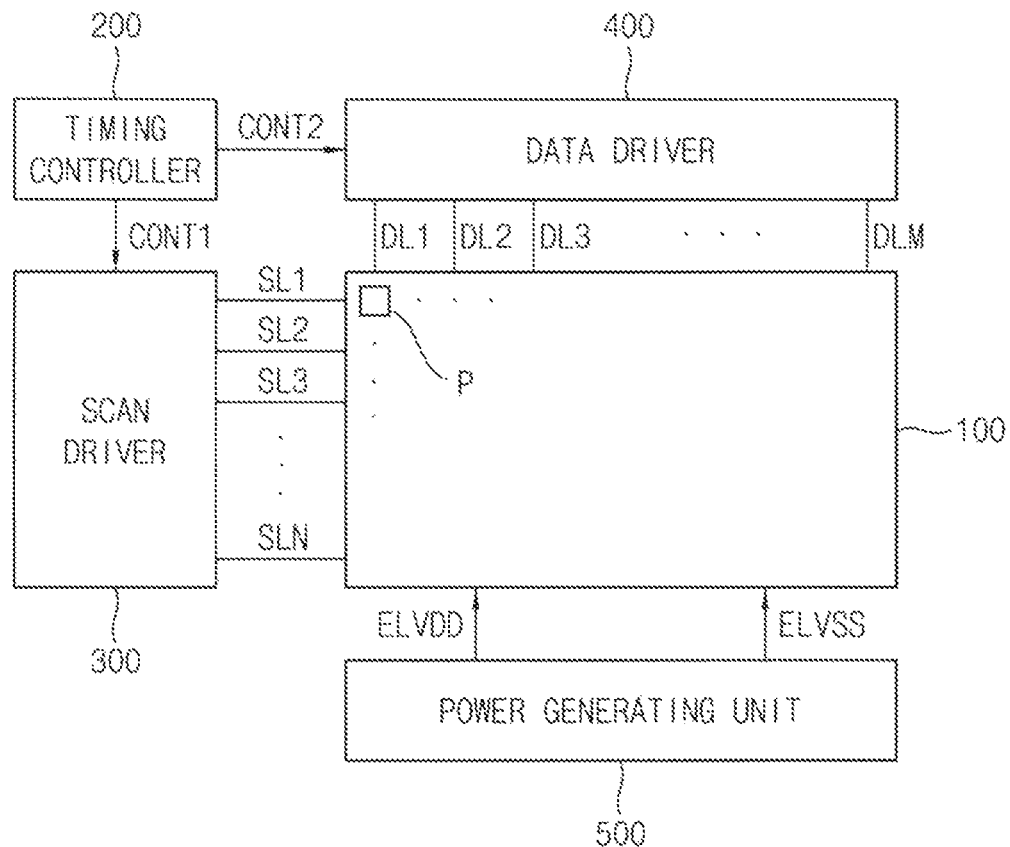
FIG. 2
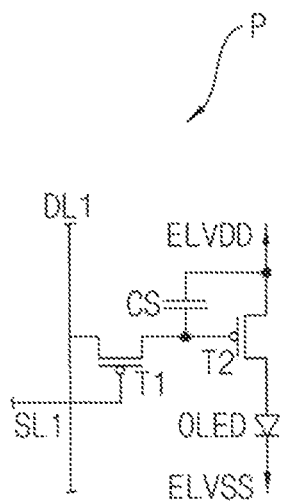

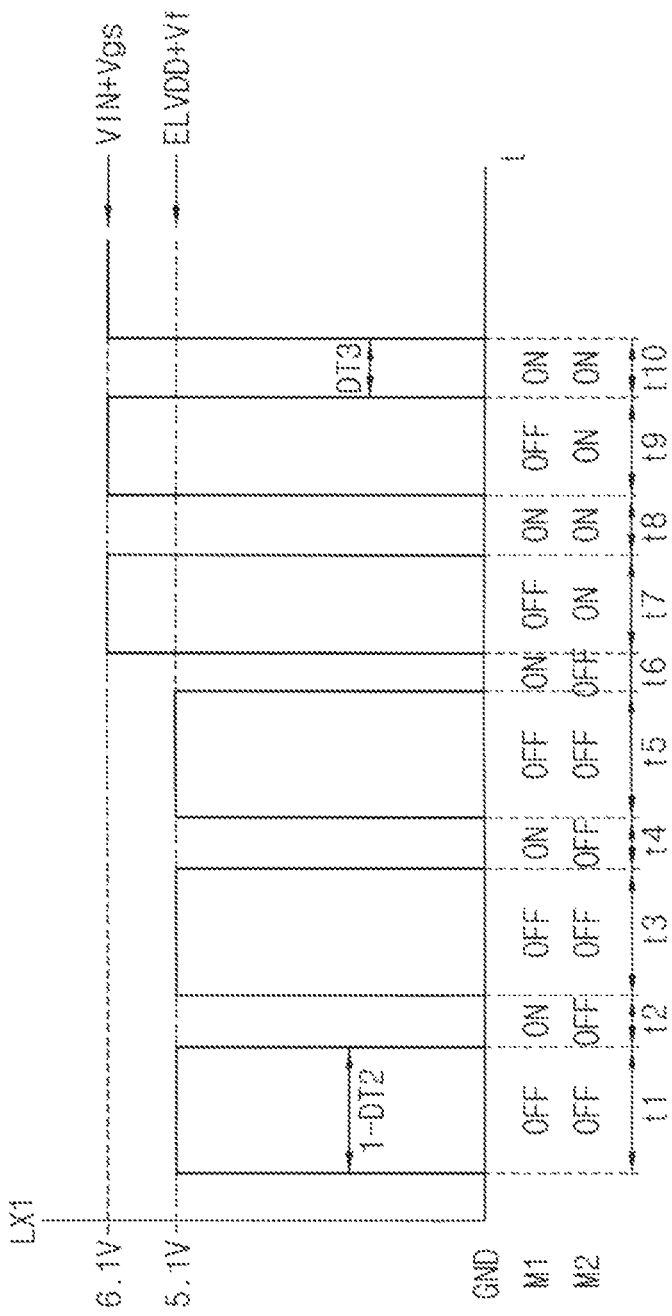

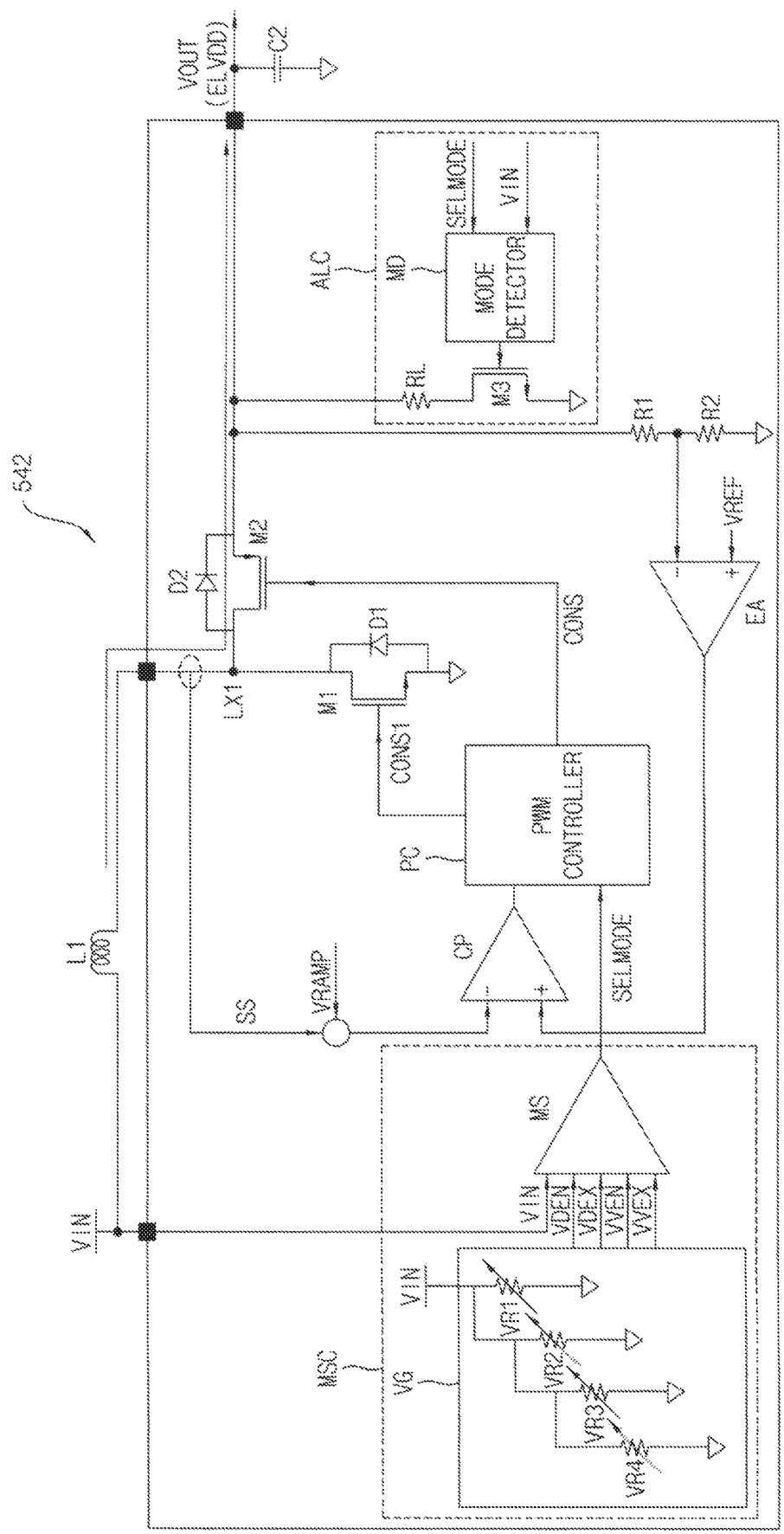

DC-DC CONVERTER AND DISPLAY APPARATUS HAVING THE SAME

CROSS-REFERENCE TO RELATED APPLICATION

This application claims priority to and the benefit of Korean Patent Application No. 10-2016-0023743, under 35 U.S.C. § 119, filed on Feb. 26, 2016 in the Korean Intellectual Property Office (KIPO), the contents of which are herein incorporated by reference in their entirety.

BACKGROUND

1. Field

One or more aspects of exemplary embodiments of the present inventive concept relate to a DC-DC converter and a display apparatus having the DC-DC converter.

2. Description of the Related Art

A display apparatus includes a DC-DC converter to convert a battery voltage to a DC voltage for a display panel. As a capacity of the battery increases, the battery voltage is gradually increasing.

In addition, as the capacity of the battery increases, a range of the battery voltage may increase, and an adapter voltage may also increase according to demand of high speed charging.

Due to the increase of the battery voltage and the adapter voltage, the stability of the DC-DC converter may decrease. For example, when the input voltage of the DC-DC converter becomes greater than the output voltage of the DC-DC converter due to the increase of the battery voltage and the adapter voltage, the DC-DC converter may not be able to stably generate the output voltage.

The above information disclosed in this Background section is for enhancement of understanding of the background of the inventive concept, and therefore, it may contain information that does not constitute prior art.

SUMMARY

One or more aspects of exemplary embodiments of the present inventive concept are directed toward a DC-DC converter for changing a converting mode according to an input voltage to stably generate an output voltage. For example, one or more aspects of exemplary embodiments of the present inventive concept are directed toward a DC-DC converter for stably generating an output voltage in spite of a change of an input voltage.

One or more aspects of exemplary embodiments of the present inventive concept are directed toward a display apparatus having the DC-DC converter.

According to an exemplary embodiment of the inventive concept, a DC-DC converter includes: a first switch; a second switch connected to the first switch; a mode selecting circuit configured to select a converting mode from one of at least a first mode and a second mode based on an input voltage; and a controller configured to generate a first switching control signal for controlling the first switch based on the converting mode, and a second switching control signal for controlling the second switch based on the converting mode.

In an exemplary embodiment, in the first mode, the first switch may be configured to be repeatedly turned on and off in response to the first switching control signal, and the second switch may be configured to be repeatedly turned on and off in response to the second switching control signal.

In an exemplary embodiment, in the second mode, the first switch may be configured to be repeatedly turned on and off in response to the first switching control signal, and the second switch may be configured to maintain a turned off state in response to the second switching control signal.

In an exemplary embodiment, the mode selecting circuit may be configured to change the converting mode from the first mode to the second mode when the input voltage increases from below a first reference voltage to be equal to or greater than the first reference voltage.

In an exemplary embodiment, the mode selecting circuit may be configured to change the converting mode from the second mode to the first mode when the input voltage decreases from above a second reference voltage to be less than the second reference voltage, and the second reference voltage may have a level different from that of the first reference voltage.

In an exemplary embodiment, the mode selecting circuit may be configured to select the converting mode from one of at least the first mode, the second mode, and a third mode.

In an exemplary embodiment, in the third mode, the first switch may be configured to be repeatedly turned on and off in response to the first switching control signal, and the second switch may be configured to maintain a turned on state in response to the second switching control signal.

In an exemplary embodiment, in the third mode, the second switching control signal may be the input voltage.

In an exemplary embodiment, the mode selecting circuit may be configured to change the converting mode from the first mode to the second mode when the input voltage increases from below a first reference voltage to be equal to or greater than the first reference voltage.

In an exemplary embodiment, the mode selecting circuit may be configured to change the converting mode from the second mode to the first mode when the input voltage decreases from above a second reference voltage to be less than the second reference voltage, and the second reference voltage may have a level different from that of the first reference voltage.

In an exemplary embodiment, the mode selecting circuit may be configured to change the converting mode from the second mode to the third mode when the input voltage increases from below a third reference voltage to be equal to or greater than the third reference voltage, and the third reference voltage may have a level that is greater than that of the first reference voltage.

In an exemplary embodiment, the mode selecting circuit may be configured to change the converting mode from the third mode to the second mode when the input voltage decreases from above a fourth reference voltage to be less than the fourth reference voltage, and the fourth reference voltage may have a level that is greater than that of the second reference voltage, and may be different from that of the third reference voltage.

In an exemplary embodiment, the DC-DC converter may be configured to output an output voltage in a current mode of a continuous conduction mode when the converting mode is the first mode, and the DC-DC converter may be configured to output the output voltage in the current mode of one of a pulse skip mode, a discontinuous conduction mode, and the continuous conduction mode, when the converting mode is the second mode.

In an exemplary embodiment, the DC-DC converter may further include an adaptive loader circuit, and the adaptive loader circuit may be configured to sequentially change the current mode from the pulse skip mode to the discontinuous conduction mode and from the discontinuous conduction mode to the continuous conduction mode when the converting mode is changed from the second mode to the first mode and the current mode is the pulse skip mode.

In an exemplary embodiment, the adaptive loader circuit may include a third switch, a load resistor connected to the third switch, and a mode detector configured to control switching of the third switch, the third switch being configured to be turned on so that the current mode may be sequentially changed from the pulse skip mode to the discontinuous conduction mode when the converting mode is changed from the second mode to the first mode and the current mode is the pulse skip mode, and the third switch may be configured to be turned off when the converting mode is the first mode.

According to an exemplary embodiment of the inventive concept, a display apparatus includes: a display panel including a plurality of scan lines, a plurality of data lines, and a plurality of subpixels, the subpixels being connected to the scan lines and the data lines; a scan driver configured to output scan signals to the scan lines; a data driver configured to output data voltages to the data lines; and a DC-DC converter including: a first switch; a second switch connected to the first switch; a mode selecting circuit configured to select a converting mode from one of at least a first mode and a second mode based on an input voltage; and a controller configured to generate a first switching control signal for controlling the first switch based on the converting mode, and a second switching control signal for controlling the second switch based on the converting mode.

In an exemplary embodiment, in the first mode, the first switch may be configured to be repeatedly turned on and off in response to the first switching control signal, and the second switch may be configured to be repeatedly turned on and off in response to the second switching control signal.

In an exemplary embodiment, in the second mode, the first switch may be configured to be repeatedly turned on and off in response to the first switching control signal, and the second switch may be configured to maintain a turned off state in response to the second switching control signal.

In an exemplary embodiment, the mode selecting circuit may be configured to change the converting mode from the first mode to the second mode when the input voltage increases from below a first reference voltage to be equal to or greater than the first reference voltage.

In an exemplary embodiment, the mode selecting circuit may be configured to change the converting mode from the second mode to the first mode when the input voltage decreases from above a second reference voltage to be less than the second reference voltage, and the second reference voltage may have a level that is different from that of the first reference voltage.

According to one or more exemplary embodiments of the inventive concept, the DC-DC converter may operate in a synchronous mode, an asynchronous diode mode, and an asynchronous VGS mode, according to a level of the input voltage, so that the DC-DC converter may stably generate the output voltage even though the input voltage is greater than the output voltage.

In addition, according to one or more exemplary embodiments of the inventive concept, an entering threshold voltage and an exiting threshold voltage of the converting modes may be set differently from each other, so that the converting mode may not repetitively change at or near the threshold voltage.

BRIEF DESCRIPTION OF THE DRAWINGS

The above and/or other aspects and features of the present inventive concept will become more apparent from the detailed description of the exemplary embodiments thereof with reference to the accompanying drawings, in which:

FIG. 1 is a block diagram illustrating a display apparatus according to an exemplary embodiment of the present inventive concept;

FIG. 2 is a circuit diagram illustrating a pixel structure of a display panel of FIG. 1;

FIG. 7B is a timing diagram illustrating an output voltage of the first converting part of FIG. 4 when the first converting part operates in the third mode;

FIG. 8 is a circuit diagram illustrating a first converting part of a DC-DC converter according to an exemplary embodiment of the present inventive concept;

DETAILED DESCRIPTION

Figure 3:
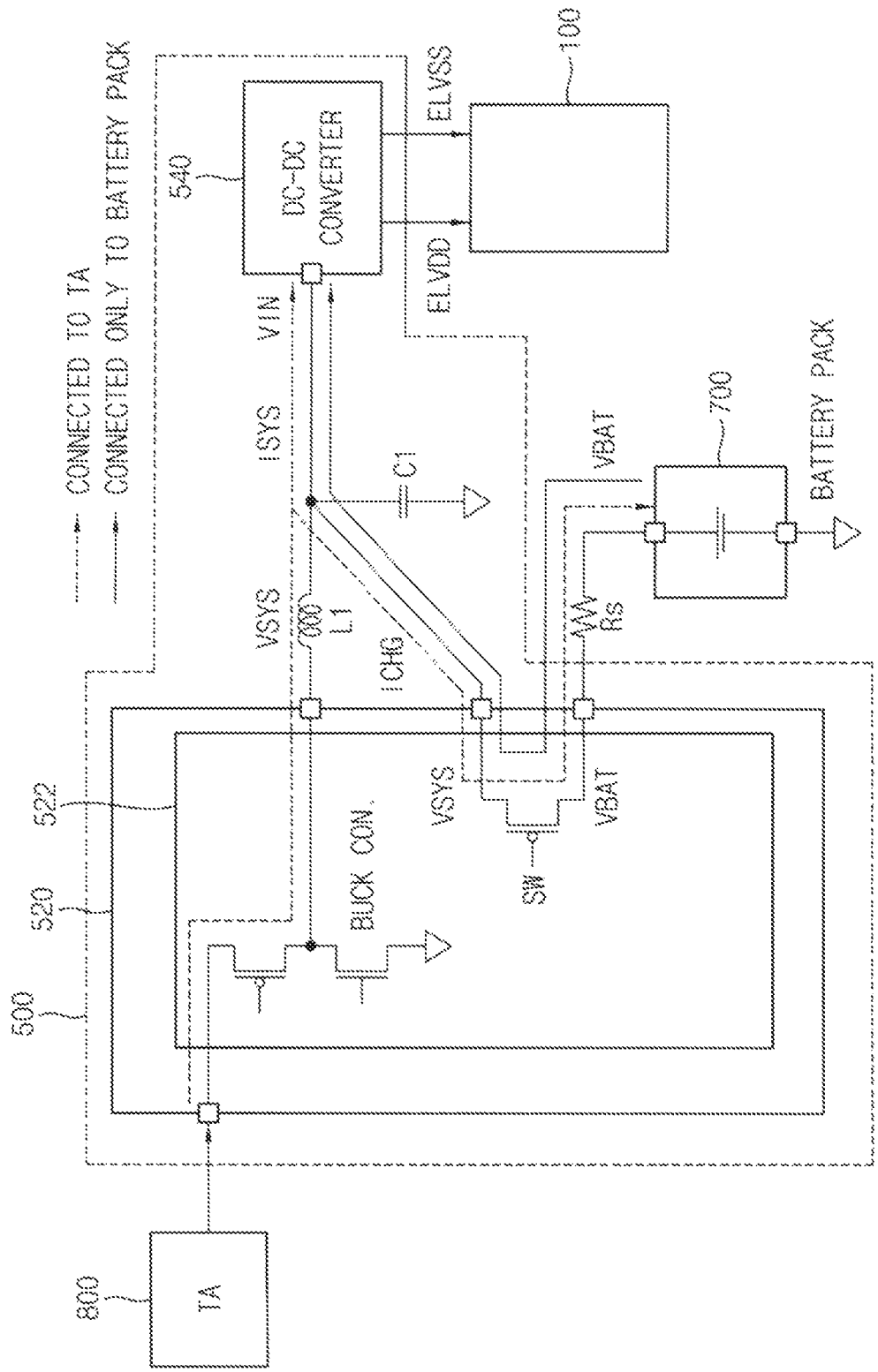
FIG. 3 is a block diagram illustrating a power generating unit of FIG. 1.

Hereinafter, example embodiments will be described in more detail with reference to the accompanying drawings. The present inventive concept, however, may be embodied in various different forms, and should not be construed as being limited to only the illustrated embodiments herein. Rather, these embodiments are provided as examples so that this disclosure will be thorough and complete, and will fully convey the aspects and features of the inventive concept to those skilled in the art. Accordingly, processes, elements, and techniques that are not necessary to those having ordinary skill in the art for a complete understanding of the aspects and features of the inventive concept may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the inventive concept.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the inventive concept refers to "one or more embodiments of the inventive concept." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display apparatus according to an exemplary embodiment of the present inventive concept.

Referring to FIG. 1, the display apparatus includes a display panel 100, a timing controller 200, a scan driver 300, a data driver 400, and a power generating unit (e.g., a power generator) 500.

In an exemplary embodiment, the timing controller 200, the scan driver 300, the data driver 400, and the power generating unit 500 may be included in an integrated circuit chip.

In an exemplary embodiment, the scan driver 300 may be mounted on the display panel 100 or integrated on the display panel 100. The data driver 400 may be mounted on the display panel 100 or integrated on the display panel 100.

The display panel 100 displays an image. The display panel 100 includes a plurality of scan lines SL1 to SLN, a plurality of data lines DL1 to DLM, and a plurality of subpixels P connected to the scan lines SL1 to SLN and the data lines DL1 to DLM. For example, the subpixels P may be disposed in a matrix form.

In an exemplary embodiment, the number of the scan lines may be equal to N. The number of the data lines may be equal to M. Herein N and M are natural numbers. In an exemplary embodiment, the number of subpixels P may be equal to N×M. In an exemplary embodiment, three subpixels P may form a pixel, so that the number of the pixels may be equal to N×M/3.

The display panel 100 is connected to the scan driver 300 through the scan lines SL1 to SLN. The display panel 100 is connected to the data driver 400 through the data lines DL1 to DLM.

In addition, the display panel 100 receives a first power voltage ELVDD and a second power voltage ELVSS from the power generating unit 500. The first power voltage ELVDD may be applied to first electrodes of organic light emitting elements of the subpixels P. The second power voltage ELVSS may be applied to second electrodes of the organic light emitting elements of the subpixels P. A structure of the subpixel P of the display panel 100 is described in more detail with reference to FIG. 2.

The timing controller 200 generates a first control signal CONT1 for controlling a driving timing of the scan driver 300, and outputs the first control signal CONT1 to the scan driver 300. The timing controller 200 generates a second control signal CONT2 for controlling a driving timing of the data driver 400, and outputs the second control signal CONT2 to the data driver 400.

The scan driver 300 generates scan signals to drive the scan lines SL1 to SLN in response to the first control signal CONT1 received from the timing controller 200. The scan driver 300 may sequentially output the scan signals to the scan lines SL1 to SLN.

The data driver 400 generates data signals to drive the data lines DL1 to DLM in response to the second control signal CONT2 received from the timing controller 200. The data driver 400 outputs the data signals to the data lines DL1 to DLM.

The power generating unit 500 generates the first power voltage ELVDD and the second power voltage ELVSS. The power generating unit 500 provides each of the first power voltage ELVDD and the second power voltage ELVSS to the display panel 100.

The first power voltage ELVDD is applied to the first electrodes of the organic light emitting elements of the subpixels P. The second power voltage ELVSS is applied to the second electrodes of the organic light emitting elements of the subpixels P. For example, the first power voltage ELVDD may be greater than the second power voltage ELVSS.

The power generating unit 500 may include a DC-DC converter to generate each of the first power voltage ELVDD and the second power voltage ELVSS. A structure and an operation of the power generating unit 500 is described in more detail with reference to FIGS. 3 through 7B.

FIG. 2 is a circuit diagram illustrating a pixel structure of the display panel 100 of FIG. 1.

Referring to FIGS. 1 and 2, the subpixel P includes a first pixel switching element (e.g., a first pixel transistor) T1, a second pixel switching element (e.g., a second pixel transistor) T2, a storage capacitor CS, and the organic light emitting element OLED.

The first pixel switching element T1 may be a thin film transistor. The first pixel switching element T1 includes a control electrode connected to the scan line SL1, an input electrode connected to the data line DL1, and an output electrode connected to a control electrode of the second pixel switching element T2.

The control electrode of the first pixel switching element T1 may be a gate electrode. The input electrode of the first pixel switching element T1 may be a source electrode. The output electrode of the first pixel switching element T1 may be a drain electrode.

The second pixel switching element T2 includes the control electrode connected to the output electrode of the first pixel switching element T1, an input electrode to which the first power voltage ELVDD is applied, and an output electrode connected to a first electrode of the organic light emitting element OLED.

The second pixel switching element T2 may be a thin film transistor. The control electrode of the second pixel switching element T2 may be a gate electrode. The input electrode of the second pixel switching element T2 may be a source electrode. The output electrode of the second pixel switching element T2 may be a drain electrode.

A first end (e.g., a first electrode) of the storage capacitor CS is connected to the input electrode of the second pixel switching element T2. A second end (e.g., a second electrode) of the storage capacitor CS is connected to the output electrode of the first pixel switching element T1.

The first electrode of the organic light emitting element OLED is connected to the output electrode of the second pixel switching element T2. The second power voltage ELVSS is applied to the second electrode of the organic light emitting element OLED.

The first electrode of the organic light emitting element OLED may be an anode electrode. The second electrode of the organic light emitting element OLED may be a cathode electrode.

The subpixel P receives the scan signal, the data signal, the first power voltage ELVDD, and the second power voltage ELVSS, and emits the organic light emitting element OLED to have a luminance corresponding to the data signal to display an image.

Figure 4:
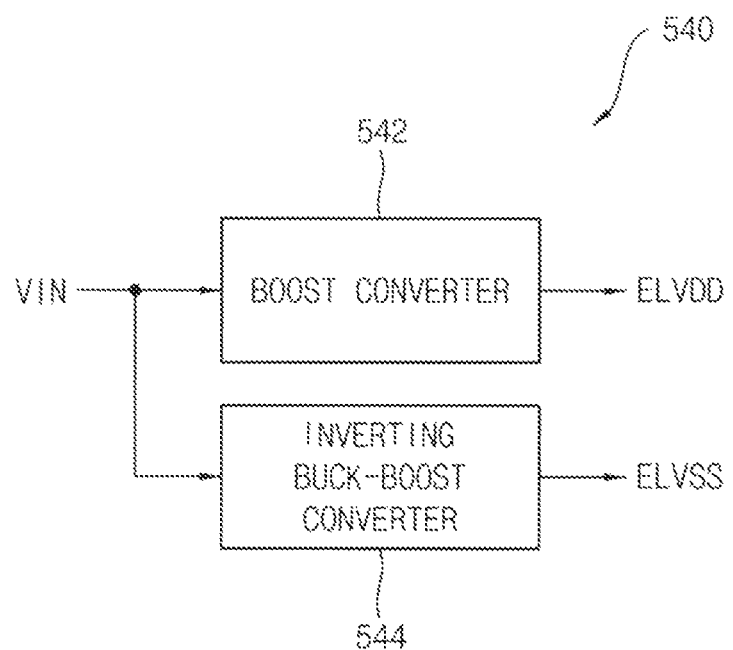
FIG. 4 is a block diagram illustrating a DC-DC converter of FIG. 3.

FIG. 3 is a block diagram illustrating the power generating unit 500 of FIG. 1. FIG. 4 is a block diagram illustrating a DC-DC converter 540 of FIG. 3.

Referring to FIGS. 1 through 4, the power generating unit 500 may include a power controller 520 and a DC-DC converter 540. The power controller 520 may include a charging block 522.

The charging block 522 may be connected to an adaptor (TA) 800 and a battery pack 700. When the adaptor 800 is connected to the charging block 522, a current of the adaptor 800 is divided into currents ISYS and ICHG, and the currents ISYS and ICHG flow through the DC-DC converter 540 and the battery pack 700, respectively. The current ISYS flowing through the DC-DC converter 540 drives the DC-DC converter 540. The current ICHG flowing through the battery pack 700 charges the battery pack 700.

The charging block 522 may include a first switching part BUCK CON. connected to the adaptor 800 to output a system voltage VSYS to the DC-DC converter 540.

The charging block 522 may include a second switching part SW connected to the battery pack 700 to output a battery voltage VBAT to the DC-DC converter 540.

The DC-DC converter 540 is connected to the charging block 522 to receive an input voltage VIN. The input voltage VIN from when the display apparatus is driven by the adaptor 800 may be different from the input voltage VIN from when the display apparatus is driven by the battery pack 700. For example, the input voltage VIN may be the system voltage VSYS when the display apparatus is driven by the adaptor 800, and the input voltage VIN may be the battery voltage VBAT when the display apparatus is driven by the battery pack 700.

The DC-DC converter 540 may include a first converting part (e.g., a first converter) 542 and a second converting part (e.g., a second converter) 544. The first converting part 542 may generate the first power voltage ELVDD based on the input voltage VIN. The second converting part 544 may generate the second power voltage ELVSS based on the input voltage VIN.

For example, the first converting part 542 may be a boost converter, and the second converting part 544 may be an inverting buck-boost converter.

For example, the system voltage VSYS may be greater than the battery voltage VBAT. For example, the system voltage VSYS may be greater than the output voltage ELVDD of the first converting part 542. For example, the battery voltage VBAT may be less than the output voltage ELVDD of the first converting part 542. For example, the system voltage VSYS may be about 4.8V, the battery voltage VBAT may be about 4.4V, and the output voltage ELVDD of the first converting part 542 may be about 4.6V.

The first converting part 542 may be the boost converter for converting a low voltage to a high voltage. Thus, when the input voltage VIN of the first converting part 542 is greater than the output voltage ELVDD of the first converting part 542, the first converting part 542 may not operate.

In the present exemplary embodiment, the first converting part 542 of the DC-DC converter operates in different modes according to the input voltage VIN, so that the first converting part 542 may generate (e.g., stably generate) the output voltage ELVDD, even though the input voltage VIN is greater than the output voltage ELVDD.

The power generating unit 500 may include an inductor L1, a capacitor C1, and a resistor Rs. A first end of the inductor L1 may be connected to an output terminal of the charging block 520. A second end of the inductor L1 may be connected to an input terminal of the DC-DC converter 540. A first end of the capacitor C1 may be connected to the input terminal of the DC-DC converter 540. A second end of the capacitor C1 may be connected to ground. A first end of the resistor Rs may be connected to a battery input terminal of the charging block 520. A second end of the resistor Rs may be connected to the battery pack 700.

Figure 5A:
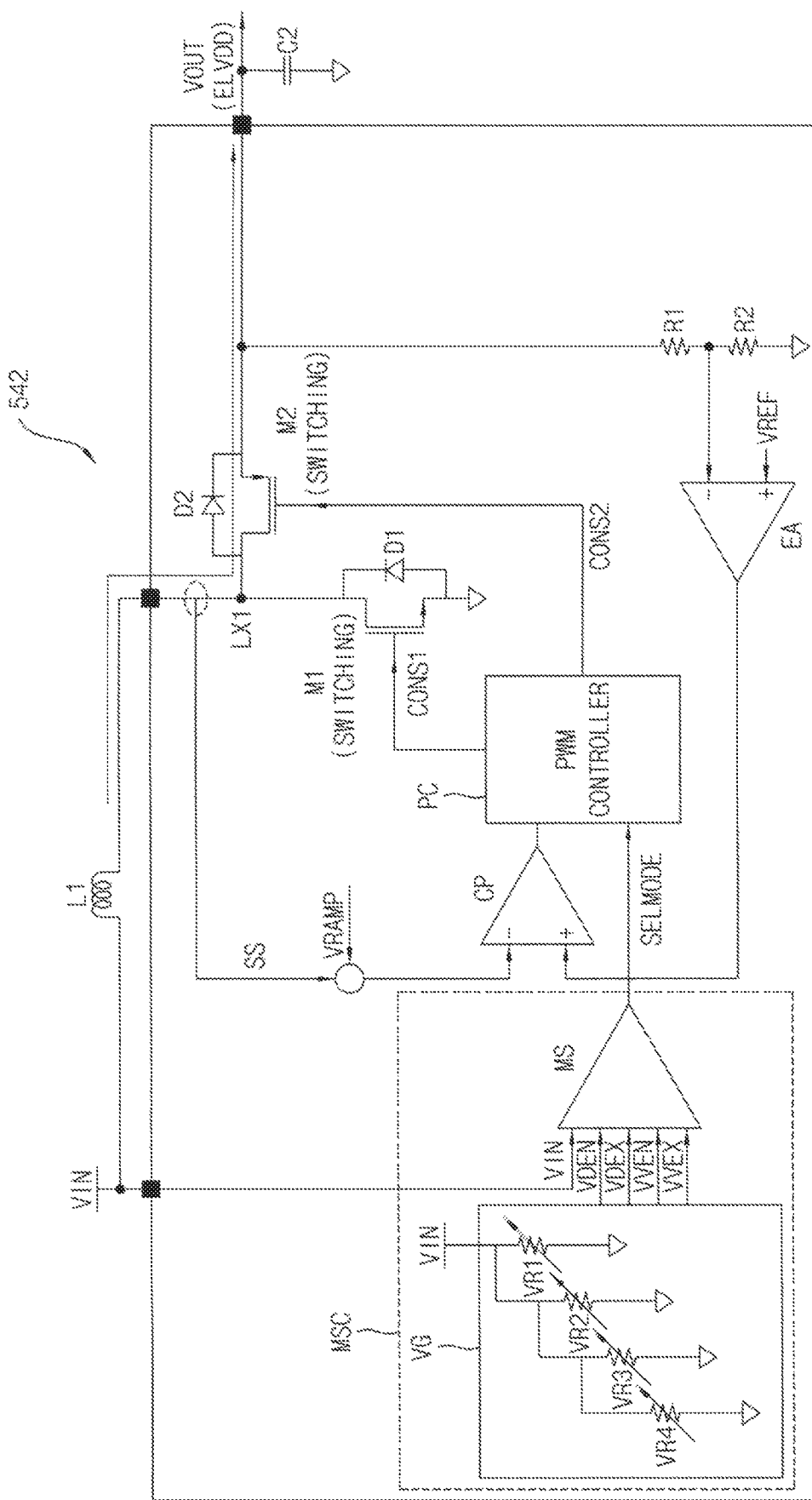
FIG. 5A is a circuit diagram illustrating a first converting part of FIG. 4 when the first converting part operates in a first mode.
Figure 5B:
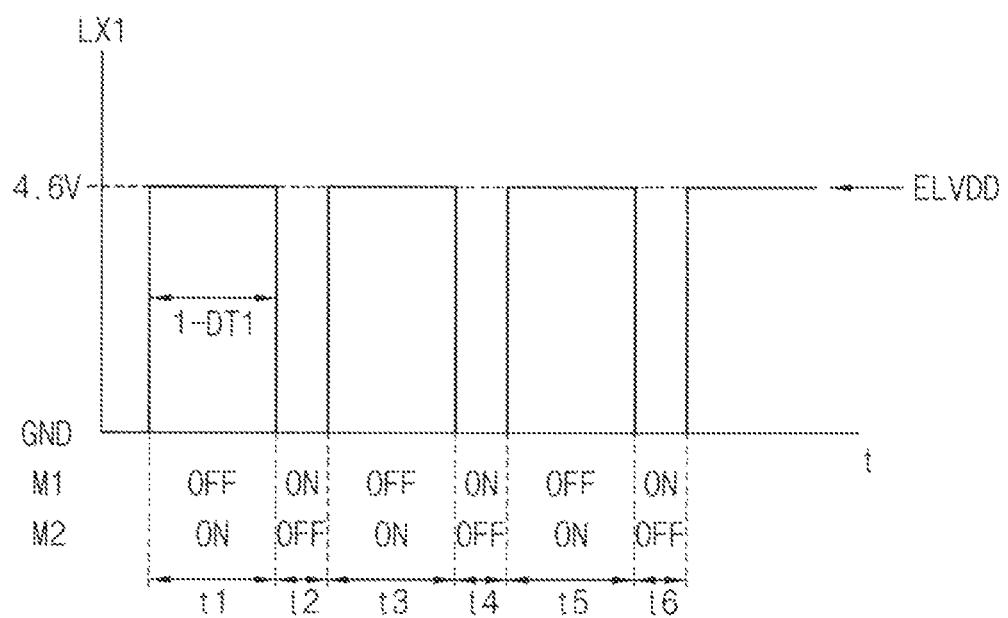
FIG. 5B is a timing diagram illustrating an output voltage of the first converting part of FIG. 4 when the first converting part operates in the first mode.
Figure 6A:
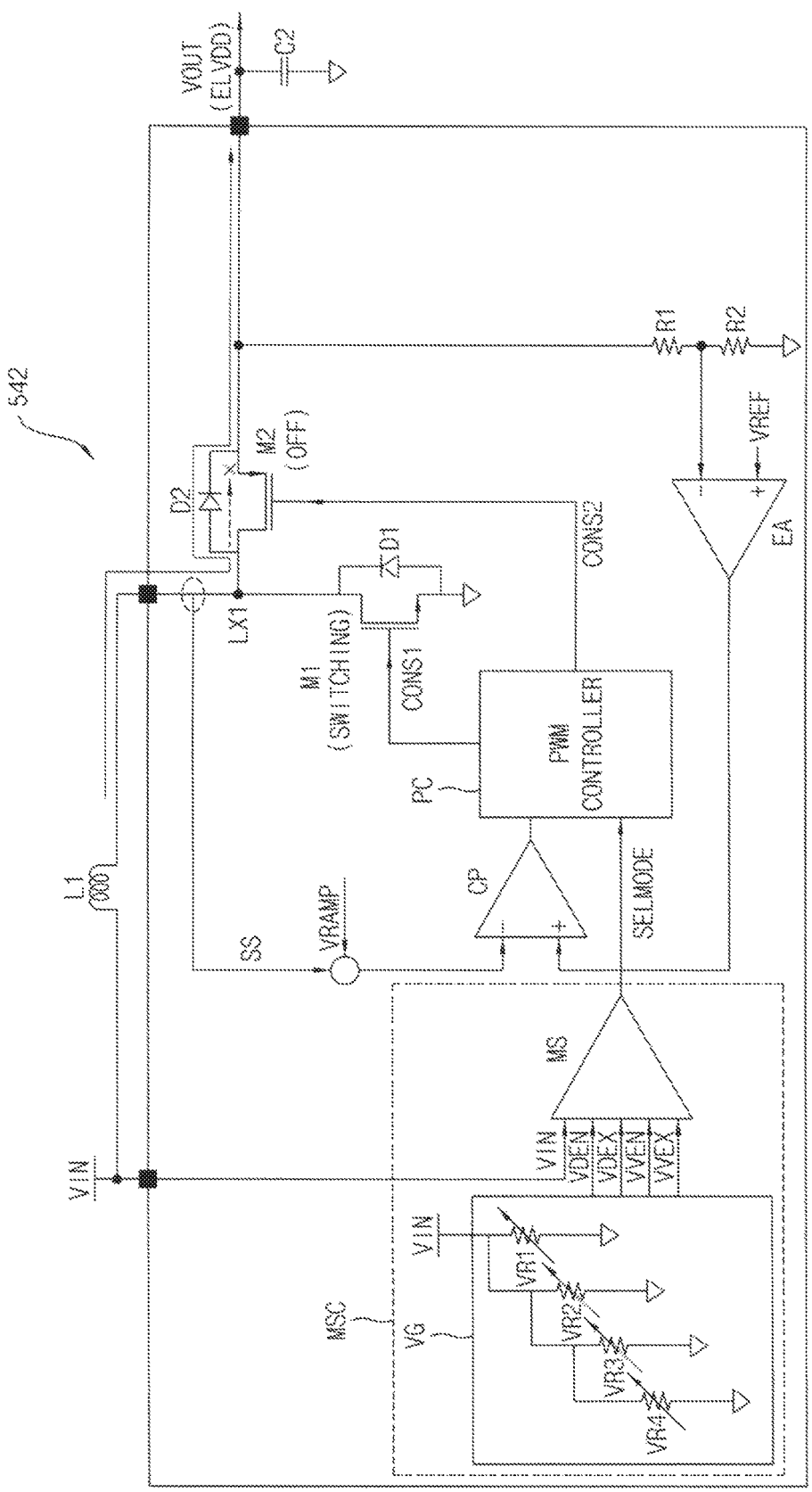
FIG. 6A is a circuit diagram illustrating the first converting part of FIG. 4 when the first converting part operates in a second mode.
Figure 6B:
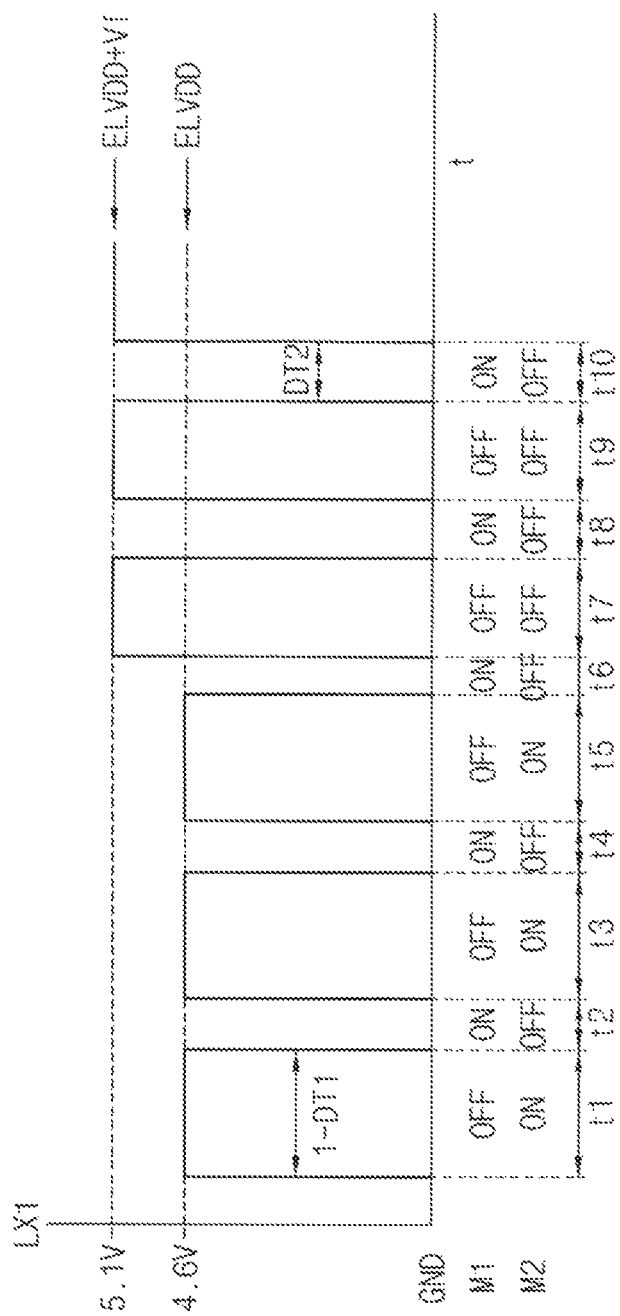
FIG. 6B is a timing diagram illustrating an output voltage of the first converting part of FIG. 4 when the first converting part operates in the second mode.
Figure 7A:
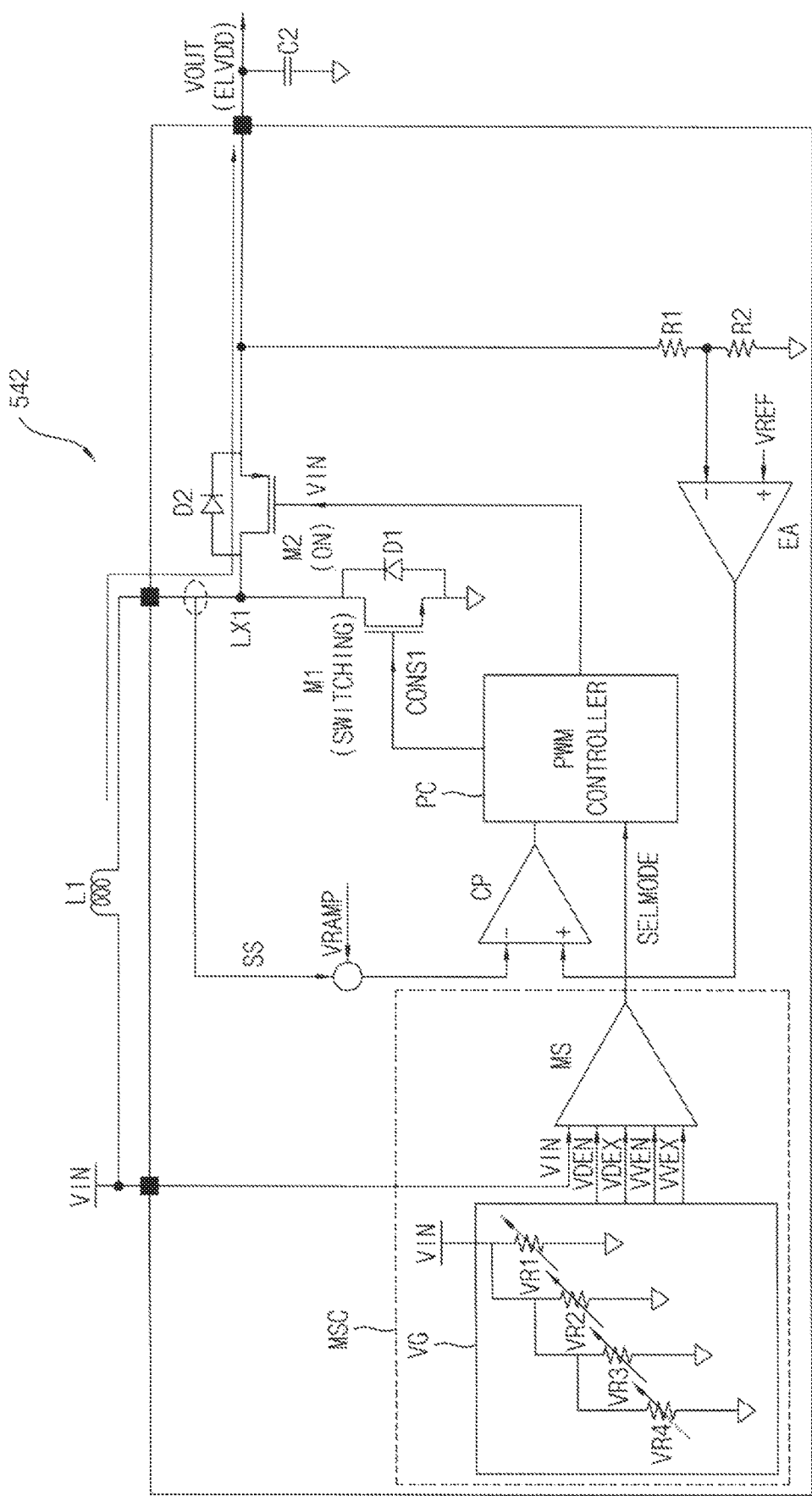
FIG. 7A is a circuit diagram illustrating the first converting part of FIG. 4 when the first converting part operates in a third mode.

FIG. 5A is a circuit diagram illustrating the first converting part 542 of FIG. 4 when the first converting part 542 operates in a first mode. FIG. 5B is a timing diagram illustrating the output voltage of the first converting part 542 of FIG. 4 when the first converting part 542 operates in the first mode. FIG. 6A is a circuit diagram illustrating the first converting part 542 of FIG. 4 when the first converting part 542 operates in a second mode. FIG. 6B is a timing diagram illustrating the output voltage of the first converting part 542 of FIG. 4 when the first converting part 542 operates in the second mode. FIG. 7A is a circuit diagram illustrating the first converting part 542 of FIG. 4 when the first converting part 542 operates in a third mode. FIG. 7B is a timing diagram illustrating the output voltage of the first converting part 542 of FIG. 4 when the first converting part 542 operates in the third mode.

Referring to FIGS. 5A and 5B, the first converting part 542 includes a first switching element (e.g., a first switch or a first switching transistor) M1, a second switching element (e.g., a second switch or a second switching transistor) M2, a mode selecting circuit MSC, and a controller PC. The first converting part 542 may further include the inductor L1, a first diode D1, a second diode D2, a comparator CP, an output capacitor C2, and a feedback circuit.

A first end of the inductor L1 is connected to the input terminal to which the input voltage VIN is applied. A second end of the inductor L1 is connected to a first node LX1.

A control electrode of the first switching element M1 is connected to the controller PC. A first electrode of the first switching element M1 is connected to the first node LX1. A second electrode of the first switching element M1 is connected to ground.

The first electrode of the first switching element M1 may be connected to a cathode electrode of the first diode D1. The second electrode of the first switching element M1 may be connected to an anode electrode of the first diode D1. For example, the first switching element M1 may be a transistor. For example, the first switching element M1 may be an N-type transistor. The first diode D1 may be a body diode of the transistor M1.

A control electrode of the second switching element M2 is connected to the controller PC. A first electrode of the second switching element M2 is connected to the first node LX1. A second electrode of the second switching element M2 is connected to an output terminal for outputting the output voltage ELVDD.

The first electrode of the second switching element M2 may be connected to an anode electrode of the second diode D2. The second electrode of the second switching element M2 may be connected to a cathode electrode of the second diode D2. For example, the second switching element M2 may be a transistor. For example, the second switching element M2 may be a P-type transistor. The second diode D2 may be a body diode of the transistor M2.

The mode selecting circuit MSC includes a reference voltage generating part (e.g., a reference voltage generator) VG and a mode selector MS. The reference voltage generating part VG receives the input voltage VIN, and generates a plurality of reference voltages VDEN, VDEX, VVEN, and VVEX. The reference voltages VDEN, VDEX, VVEN, and VVEX are used to determine a converting mode SELMODE of the first converting part 542.

The reference voltage generating part VG may generate a first reference voltage VDEN based on the input voltage VIN. The first reference voltage VDEN determines entering the second mode from the first mode. The first reference voltage VDEN may be generated using a first variable resistor VR1.

The reference voltage generating part VG may generate a second reference voltage VDEX based on the input voltage VIN. The second reference voltage VDEX determines exiting from the second mode to the first mode. The second reference voltage VDEX may be generated using a second variable resistor VR2.

The input voltage VIN, the first reference voltage VDEN, and the second reference voltage VDEX are inputted to the mode selector MS. The mode selector MS compares the input voltage VIN to each of the first reference voltage VDEN and the second reference voltage VDEX to output the converting mode SELMODE.

When the input voltage VIN increases from a level below the first reference voltage VDEN to a level that is equal to or greater than that of the first reference voltage VDEN, the mode selector MS changes the converting mode SELMODE from the first mode to the second mode. The first reference voltage VDEN may be referred to as an entering threshold voltage of the second mode.

When the input voltage VIN decreases from a level above the second reference voltage VDEX to a level that is less than that of the second reference voltage VDEX, the mode selector MS changes the converting mode SELMODE from the second mode to the first mode. The second reference voltage VDEX may be referred to as an exiting threshold voltage of the second mode.

For example, the second reference voltage VDEX may have a level that is different from that of the first reference voltage VDEN. For example, the second reference voltage VDEX may have a level less than that of the first reference voltage VDEN. The second reference voltage VDEX is set to be different from the first reference voltage VDEN, so that the converting mode SELMODE is prevented or substantially prevented from repeatedly changing near the threshold voltage.

The first mode may be a synchronous mode. In the first mode, the first switching element M1 may be repeatedly turned on and off in response to a first switching control signal CONS1, and the second switching element M2 may be repeatedly turned on and off in response to a second switching control signal CONS2.

In the first mode, the status of the first switching element M1 and the status of the second switching element M2 are synchronized with each other, so that the first mode may be referred to as the synchronous mode.

For example, in the first mode, when the first switching element M1 is turned on, the second switching element M2 is turned off, and when the first switching element M1 is turned off, the second switching element M2 is turned on.

Referring to FIG. 5B, the first converting part 542 operates only in the first mode (t1 to t6). For example, here the input voltage VIN may be less than the first reference voltage VDEN.

The first mode is the synchronous mode, and the output voltage VOUT is the first power voltage ELVDD in the first mode.

The second mode may be an asynchronous mode. In the second mode, the first switching element M1 may be repeatedly turned on and off in response to the first switching control signal CONS1, and the second switching element M2 may be maintained in a turned off status in response to the second switching control signal CONS2.

In the second mode, the status of the first switching element M1 and the status of the second switching element M2 are not synchronized with each other, so that the second mode may be referred to as the asynchronous mode. Referring to FIG. 6A, in the second mode, the second switching element M2 is turned off, and current flows through the body diode D2 of the second switching element M2, so that the second mode may be referred to as the asynchronous diode mode.

Referring to FIG. 6B, the first converting part 542 operates in the first mode (t1 to t6), and the mode of the first converting part 542 changes to the second mode (t7 to t10). For example, during t1 to t6, the input voltage VIN may be less than the first reference voltage VDEN. At t7, the input voltage VIN may increase to be equal to or greater than the first reference voltage VDEN.

The second mode is the asynchronous diode mode, and the output voltage VOUT is the first power voltage ELVDD in the second mode. The voltage at the first node LX1 is determined as a sum of the first power voltage ELVDD and a forward drop voltage Vf of the second diode D2. For example, the forward drop voltage Vf of the second diode D2 may be about 0.5V.

When the input voltage VIN increases, and thus, a minimum on duty for the first converting part 542 to operate in the first mode is not retained, a voltage difference between ends (e.g., both ends) of the inductor L1 is small (e.g., very small), so that the first switching element M1 and the second switching element M2 may not operate normally.

When the input voltage VIN increases to be equal to or greater than the first reference voltage VDEN, the converting mode of the first converting part 542 is changed to the second mode. When the converting mode of the first converting part 542 is changed to the second mode, before the input voltage VIN changes to the minimum on duty (e.g., predetermined minimum on duty), the second switching element M2 is turned off. When the second switching element M2 is turned off, the first converting part 542 is driven by freewheeling of the body diode D2 of the second switching element M2.

In the second mode, due to the forward drop Vf of the second diode D2, the minimum on duty increases. The voltage at the first node LX1 increases by the forward drop voltage Vf of the second diode D2, so that the voltage difference between ends of the inductor L1 increases. Thus, switching regulation may be possible due to the increased voltage difference between ends of the inductor L1.

The reference voltage generating part VG may further generate a third reference voltage VVEN based on the input voltage VIN. The third reference voltage VVEN determines entering a third mode from the second mode. The third reference voltage VVEN may be generated using a third variable resistor VR3.

The reference voltage generating part VG may further generate a fourth reference voltage VVEX based on the input voltage VIN. The fourth reference voltage VVEX determines exiting from the third mode to the second mode. The fourth reference voltage VVEX may be generated using a fourth variable resistor VR4.

The input voltage VIN, the first reference voltage VDEN, the second reference voltage VDEX, the third reference voltage VVEN, and the fourth reference voltage VVEX are inputted to the mode selector MS. The mode selector MS compares the input voltage VIN to each of the first reference voltage VDEN, the second reference voltage VDEX, the third reference voltage VVEN, and the fourth reference voltage VVEX, to output the converting mode SELMODE.

When the input voltage VIN increases from a level below the third reference voltage VVEN to a level that is equal to or greater than that of the third reference voltage VVEN, the mode selector MS changes the converting mode SELMODE from the second mode to the third mode. The third reference voltage VVEN may be referred to as an entering threshold voltage of the third mode.

For example, the third reference voltage VVEN may have a level that is greater than that of the first reference voltage VDEN.

When the input voltage VIN decreases from a level above the fourth reference voltage VVEX to a level that is less than that of the fourth reference voltage VVEX, the mode selector MS changes the converting mode SELMODE from the third mode to the second mode. The fourth reference voltage VVEX may be referred to as an exiting threshold voltage of the third mode.

For example, the fourth reference voltage VVEX may have a level that is greater than that of the second reference voltage VDEX.

For example, the fourth reference voltage VVEX may have a level that is different from that of the third reference voltage VVEN. For example, the fourth reference voltage VVEX may have a level that is less than that of the third reference voltage VVEN. The fourth reference voltage VVEX is set to be different from the third reference voltage VVEN, so that the converting mode SELMODE is prevented or substantially prevented from repeatedly changing near the threshold voltage.

For example, the second reference voltage VDEX may be less than the first reference voltage VDEN, the first reference voltage VDEN may be less than the fourth reference voltage VVEX, and the fourth reference voltage VVEX may be less than the third reference voltage VVEN.

The third mode may be an asynchronous VGS mode. In the third mode, the first switching element M1 may be repeatedly turned on and off in response to the first switching control signal CONS1, and the second switching element M2 may maintain a turned on status in response to the second switching control signal CONS2. In the third mode, the input voltage VIN is applied to the control electrode of the second switching element M2.

In the third mode, the status of the first switching element M1 and the status of the second switching element M2 are not synchronized with each other, so that the third mode may be referred to as the asynchronous mode. Referring to FIG. 7A, in the third mode, the input voltage VIN is applied to the control electrode of the second switching element M2 to turn on the second switching element M2, and the voltage at the first node LX1 is a sum of the input voltage VIN and a gate-source voltage VGS of the second switching element M2, so that the third mode is referred to as an asynchronous VGS mode.

Referring to FIG. 7B, the first converting part 542 operates in the second mode (t1 to t6), and the mode of the first converting part 542 changes to the third mode (t7 to t10). For example, during t1 to t6, the input voltage VIN may be less than the third reference voltage VVEN. At t7, the input voltage VIN may increase to be equal to or greater than the third reference voltage VVEN.

The third mode is the asynchronous VGS mode, and the output voltage VOUT is the first power voltage ELVDD in the third mode.

When the input voltage VIN further increases to exceed the forward drop voltage Vf of the second diode D2, a minimum on duty for the first converting part 542 to operate in the second mode is not retained. When the minimum on duty for the first converting part 542 to operate in the second mode is not retained, the input voltage VIN may be applied to the control electrode (e.g., a gate electrode) of the second switching element M2. When the input voltage VIN is applied to the control electrode (e.g., the gate electrode) of the second switching element M2, the voltage at the first node LX1 increases, and the on duty also increases. Thus, switching regulation may be possible.

When the first switching element M1 is turned off in the third mode, the voltage at the control electrode of the second switching element M2 is the input voltage VIN, and the voltage at the first node LX1 is the sum of the input voltage VIN and the gate-source voltage VGS of the second switching element M2. When the sum of the input voltage VIN and the gate-source voltage VGS of the second switching element M2 is at a suitable level for the third mode, the current flowing through the inductor L1 is transmitted to the output terminal.

The comparator CP includes a first input terminal for receiving a comparing reference voltage VRAMP, a second input terminal for receiving a feedback voltage from the feedback circuit, and an output terminal for outputting a comparing result by comparing the comparing reference voltage VRAMP inputted to the first input terminal and the feedback voltage inputted to the second input terminal. A sum of the comparing reference voltage VRAMP and a sensing signal SS generated based on a current passing through the inverter L1 may be applied to the first input terminal.

The controller PC receives the comparing result from the comparator CP, and receives the converting mode SELMODE from the mode selector MS. The controller PC generates the first switching control signal CONS1 for controlling the first switching element M1 based on the converting mode SELMODE and the comparing result from the comparator CP. The controller PC generates the second switching control signal CONS2 for controlling the second switching element M2 based on the converting mode SELMODE and the comparing result from the comparator CP.

In the first mode, the second mode, and the third mode, the first switching control signal CONS1 may be a pulse width modulation signal for repeatedly turning on and off the first switching element M1. In the first mode, a duty ratio of the pulse width modulation signal may be DT1. In the second mode, the duty ratio of the pulse width modulation signal may be DT2. In the third mode, the duty ratio of the pulse width modulation signal may be DT3.

In the first mode, the second switching control signal CONS2 may be a pulse width modulation signal for repeatedly turning on and off the second switching element M2. In the second mode, the second switching control signal CONS2 may be a signal to maintain the turned off status of the second switching element M2. In the third mode, the second switching control signal CONS2 may be a signal to maintain the turned on status of the second switching element M2. For example, in the third mode, the second switching control signal CONS2 may be the input voltage VIN.

The output capacitor C2 includes a first end connected to the output terminal for outputting the output voltage ELVDD, and a second end connected to ground.

The feedback circuit may include a first resistor R1, a second resistor R2, and an error amplifier EA.

The first resistor R1 includes a first end connected to the output terminal, and a second end connected to a first input terminal of the error amplifier EA.

The second resistor R2 includes a first end connected to the first input terminal of the error amplifier EA, and a second end connected to ground.

A feedback reference voltage VREF is applied to a second input terminal of the error amplifier EA. An output terminal of the error amplifier EA is connected to the second input terminal of the comparator CP.

According to an exemplary embodiment, the controller PC determines the mode of the first converting mode 542 from among one of the synchronous mode, the asynchronous diode mode, and the asynchronous VGS mode, according to a level of the input voltage VIN, so that the DC-DC converter may stably generate the output voltage ELVDD, even though the input voltage VIN is greater than the output voltage ELVDD.

In addition, an entering threshold voltage and an exiting threshold voltage of each of the converting modes are set differently from each other, so that the converting modes may not be repetitively changed at or near the threshold voltage.

Figure 9A:
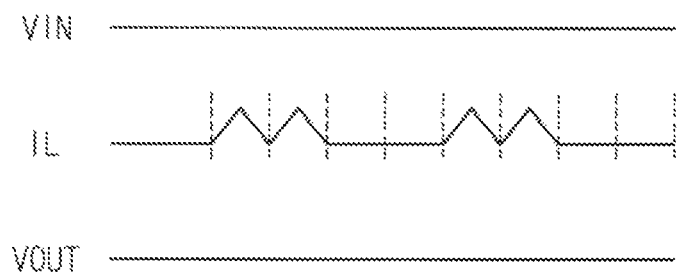
FIG. 9A is a timing diagram illustrating an input voltage, an inverter current, and an output voltage in a pulse skip mode from among current modes of the first converting part of FIG. 8.
Figure 9B:
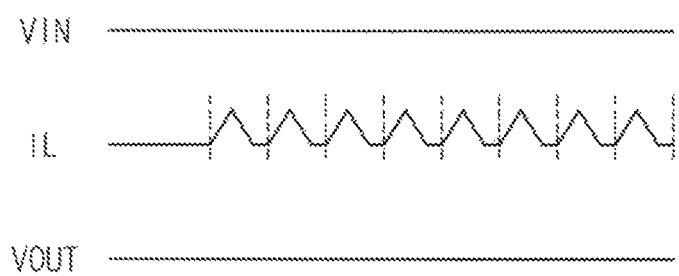
FIG. 9B is a timing diagram illustrating the input voltage, the inverter current, and the output voltage in a discontinuous conduction mode from among the current modes of the first converting part of FIG. 8.
Figure 9C:
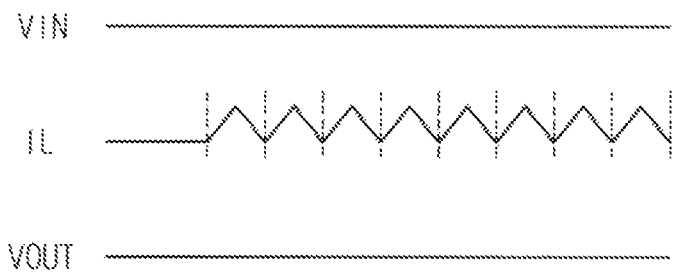
FIG. 9C is a timing diagram illustrating the input voltage, the inverter current, and the output voltage in a continuous conduction mode from among the current modes of the first converting part of FIG. 8.
Figure 10A:
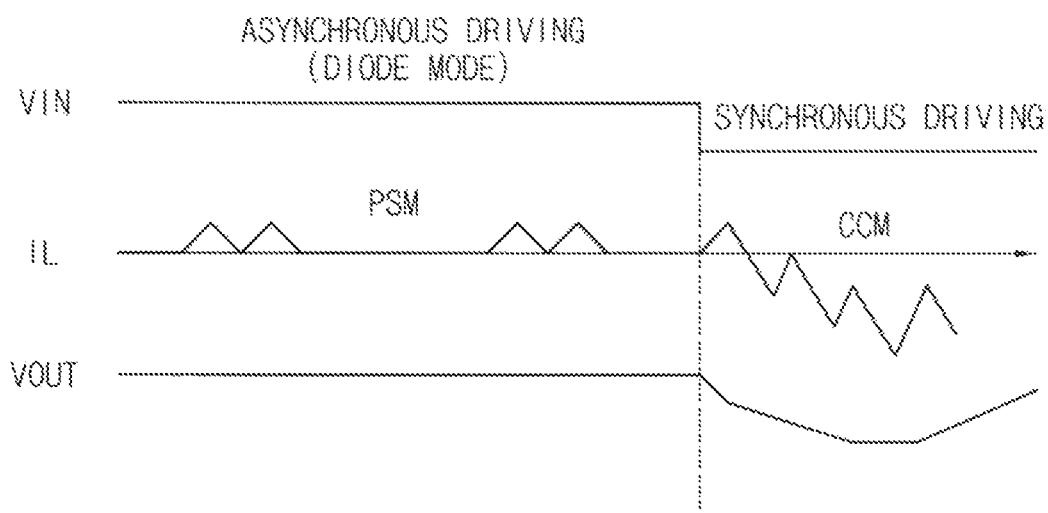
FIG. 10A is a timing diagram illustrating the input voltage, the inverter current, and the output voltage when the mode of the first converting part of FIG. 8 changes from the second mode from among the converting modes and the pulse skip mode from among the current modes to the first mode from among the converting modes and the continuous conduction mode from among the current modes.
Figure 10B:
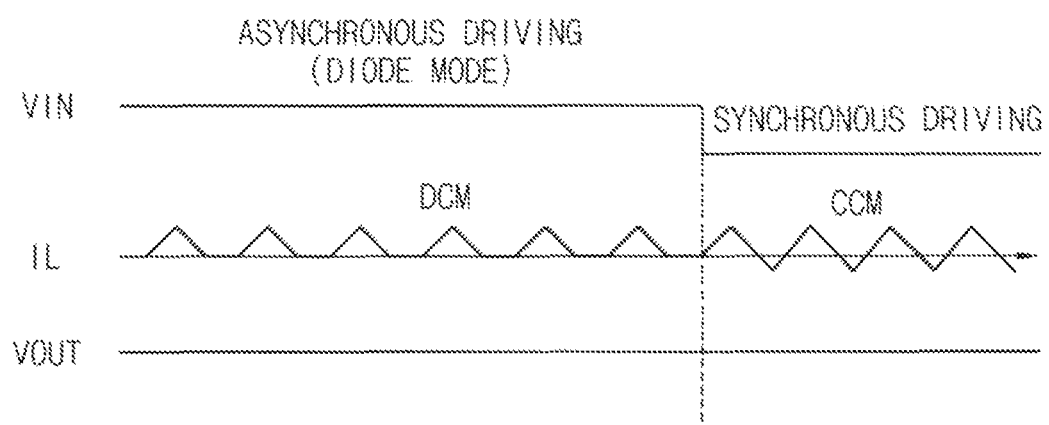
FIG. 10B is a timing diagram illustrating the input voltage, the inverter current, and the output voltage when the mode of the first converting part of FIG. 8 changes from the second mode from among the converting modes and the discontinuous conduction mode from among the current modes to the first mode from among the converting modes and the continuous conduction mode from among the current modes.

FIG. 8 is a circuit diagram illustrating the first converting part of a DC-DC converter according to an exemplary embodiment of the present inventive concept. FIG. 9A is a timing diagram illustrating the input voltage, an inverter current, and an output voltage in a pulse skip mode from among current modes of the first converting part of FIG. 8. FIG. 9B is a timing diagram illustrating the input voltage, the inverter current, and the output voltage in a discontinuous conduction mode from among the current modes of the first converting part of FIG. 8. FIG. 9C is a timing diagram illustrating the input voltage, the inverter current, and the output voltage in a continuous conduction mode from among the current modes of the first converting part of FIG. 8. FIG. 10A is a timing diagram illustrating the input voltage, the inverter current, and the output voltage when the mode of the first converting part of FIG. 8 changes from the second mode from among the converting modes and the pulse skip mode from among the current modes to the first mode from among the converting modes and the continuous conduction mode from among the current modes. FIG. 10B is a timing diagram illustrating the input voltage, the inverter current, and the output voltage when the mode of the first converting part of FIG. 8 changes from the second mode from among the converting modes and the discontinuous conduction mode from among the current modes to the first mode from among the converting modes and the continuous conduction mode from among the current modes.

The DC-DC converter, the method of DC-DC converting using the DC-DC converter, and the display apparatus including the DC-DC converter according to the present exemplary embodiment is the same or substantially the same as the DC-DC converter, the method of DC-DC converting using the DC-DC converter, and the display apparatus including the DC-DC converter according to the exemplary embodiment described with reference to FIGS. 1 through 7B, except that the first converting part 542 of the DC-DC converter in FIG. 8 further includes an adaptive loader circuit ALC. Thus, the same reference numerals will be used to refer to the same or like parts as those described in the exemplary embodiment of FIGS. 1 through 7B, and repetitive description of the same or substantially the same elements may not be repeated.

Referring to FIGS. 1 through 10B, the display apparatus includes a display panel 100, a timing controller 200, a scan driver 300, a data driver 400, and a power generating unit (e.g., a power generator) 500.

The power generating unit 500 may include a power controller 520 and a DC-DC converter 540. The power controller 520 may include a charging block 522.

The DC-DC converter 540 may include a first converting part (e.g., a first converter) 542 and a second converting part (e.g., a second converter) 544. The first converting part 542 may generate the first power voltage ELVDD based on the input voltage VIN. The second converting part 544 may generate the second power voltage ELVSS based on the input voltage VIN.

Referring to FIG. 8, the first converting part 542 includes a first switching element (e.g., a first switch or a first switching transistor) M1, a second switching element (e.g., a second switch or a second switching transistor) M2, a mode selecting circuit MSC, and a controller PC. The first converting part 542 may further include the inductor L1, a first diode D1, a second diode D2, a comparator CP, an output capacitor C2, and a feedback circuit.

In the present exemplary embodiment, the first converting part 542 may further include an adaptive loader circuit ALC.

When the converting mode SELMODE is the first mode, the first converting part 542 may generate an output voltage in a current mode of a continuous conduction mode (CCM).

When the converting mode is the second mode, the first converting part 542 may generate the output voltage in a current mode of one of a pulse skip mode (PSM) and a discontinuous conduction mode (DCM).

Referring to FIG. 9A, the graph represents the waveforms in the current mode of the pulse skip mode. In the pulse skip mode, the inverter current IL has a pulse in some cycles, but does not have a pulse in other cycles.

Referring to FIG. 9B, the graph represents the waveforms in the current mode of the discontinuous conduction mode. In the discontinuous conduction mode, the inverter current IL has an increasing period, a decreasing period, and a maintaining period during a cycle. In the discontinuous conduction mode, the inverter current IL does not continuously increase and decrease in subsequent cycles. In the discontinuous conduction mode, the increase and the decrease of the inverter current IL are cut by the maintaining period in subsequent cycles. Thus, the mode having the above described inverter current IL is referred to as the discontinuous conduction mode.

Referring to FIG. 9C, the graph represents the waveforms in the current mode of the continuous conduction mode. In the continuous conduction mode, the inverter current IL has an increasing period and a decreasing period during a cycle. In the continuous conduction mode, the inverter current IL continuously increase and decrease in subsequent cycles. Thus, the mode having the above described inverter current IL is referred to as the continuous conduction mode.

According to a load of the display panel 100 connected to the DC-DC converter 540, the current mode of the first converting part 542 may be determined. For example, when the load of the display panel 100 connected to the DC-DC converter 540 is less than a first reference load, the current mode of the first converting part 542 may be the pulse skip mode. For example, when the load of the display panel 100 connected to the DC-DC converter 540 is equal to or greater than the first reference load and less than a second reference load, the current mode of the first converting part 542 may be the discontinuous conduction mode. For example, when the load of the display panel 100 connected to the DC-DC converter 540 is equal to or greater than the second reference load, the current mode of the first converting part 542 may be the continuous conduction mode.

Referring to FIG. 8, the adaptive loader circuit ALC may be connected to the output terminal of the first converting part 542. The adaptive loader circuit ALC may include a mode detector MD, a third switching element (e.g., a third switching transistor) M3, and a load resistor RL.

The third switching element M3 includes a control electrode connected to the mode detector MD, a first electrode connected to a first end of the load resistor RL, and a second electrode connected to ground.

The load resistor RL includes the first end connected to the first electrode of the third switching element M3, and a second end connected to the output terminal of the first converting part 542.

The mode detector MD controls on and off operations of the third switching element M3 based on the converting mode SELMODE and the input voltage VIN.

When the converting mode SELMODE is changed from the second mode to the first mode, and the current mode is the pulse skip mode, the current mode is sequentially changed from the pulse skip mode to the discontinuous conduction mode and from the discontinuous conduction mode to the continuous conduction mode by the adaptive loader circuit ALC.

As shown in FIG. 10A, when the current mode is changed from the pulse skip mode PSM to the continuous conduction mode CCM, the level of the inverter current IL changes unstably. Accordingly, the level of the output voltage VOUT of the first converting part 542 may also be unstable.

When the converting mode SELMODE is changed from the second mode to the first mode, and the current mode is the pulse skip mode, the third switching element M3 is turned on, so that the load resistor RL is connected to the output terminal. Thus, the current mode of the first converting part 542 may be changed from the pulse skip mode to the discontinuous conduction mode.

When the converting mode SELMODE is the first mode, the third switching element M3 is turned off.

As shown in FIG. 10B, when the current mode is sequentially changed from the pulse skip mode to the discontinuous conduction mode DCM, and from the discontinuous conduction mode DCM to the continuous conduction mode CCM, the level of the inverter current IL may change stably.

Accordingly, the level of the output voltage VOUT of the first converting part 542 may also be stable.

According to the present exemplary embodiment, the controller PC determines the mode of the first converting mode 542 from among one of the synchronous mode, the asynchronous diode mode, and the asynchronous VGS mode according to a level of the input voltage VIN, so that the DC-DC converter may stably generate the output voltage ELVDD, even though the input voltage VIN is greater than the output voltage ELVDD.

In addition, an entering threshold voltage and an exiting threshold voltage of each of the converting modes are set differently from each other, so that the converting modes may not repetitively change at or near the threshold voltage.

In addition, when the converting mode SELMODE is changed from the second mode to the first mode, and the current mode is the pulse skip mode, the current mode may be sequentially changed from the pulse skip mode to the discontinuous conduction mode and from the discontinuous conduction mode to the continuous conduction mode. Thus, the output voltage ELVDD may be stably outputted in spite of the change of the converting mode SELMODE.

Figure 11:
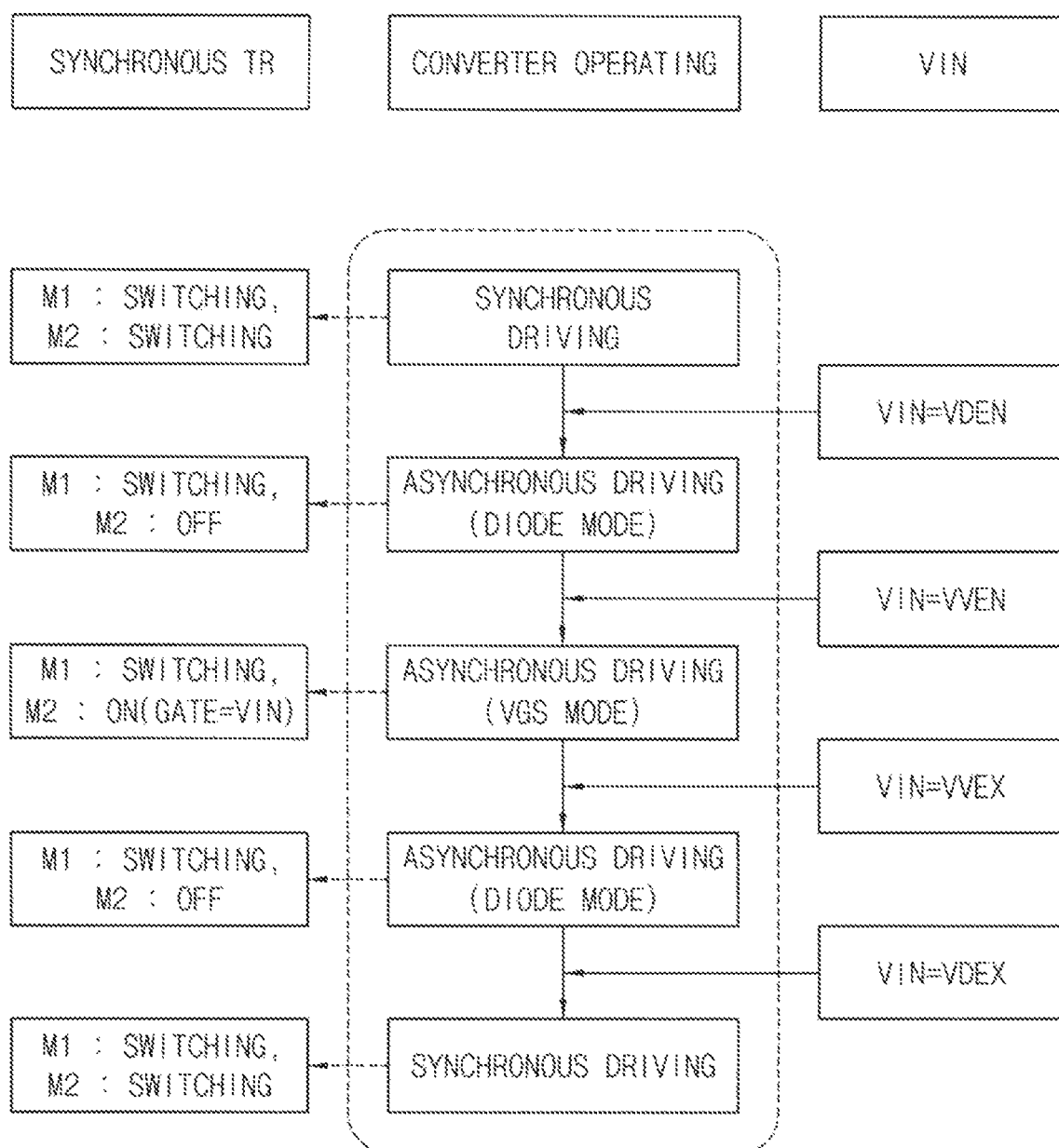
FIG. 11 is a flowchart illustrating a method of DC-DC converting according to an exemplary embodiment of the present inventive concept.
Figure 12A:
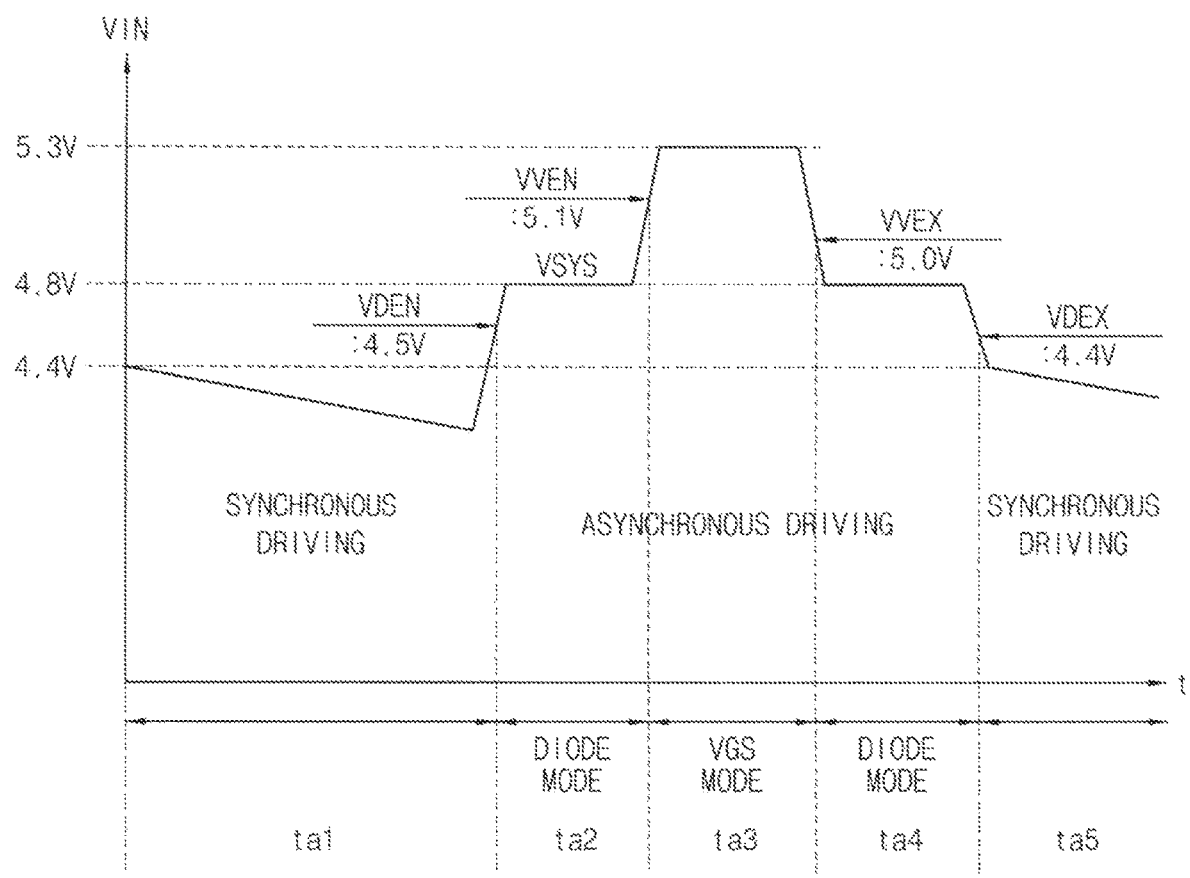
FIG. 12A is a timing diagram illustrating the method of DC-DC converting of FIG. 11 when the output voltage is about 4.6V.
Figure 12B:
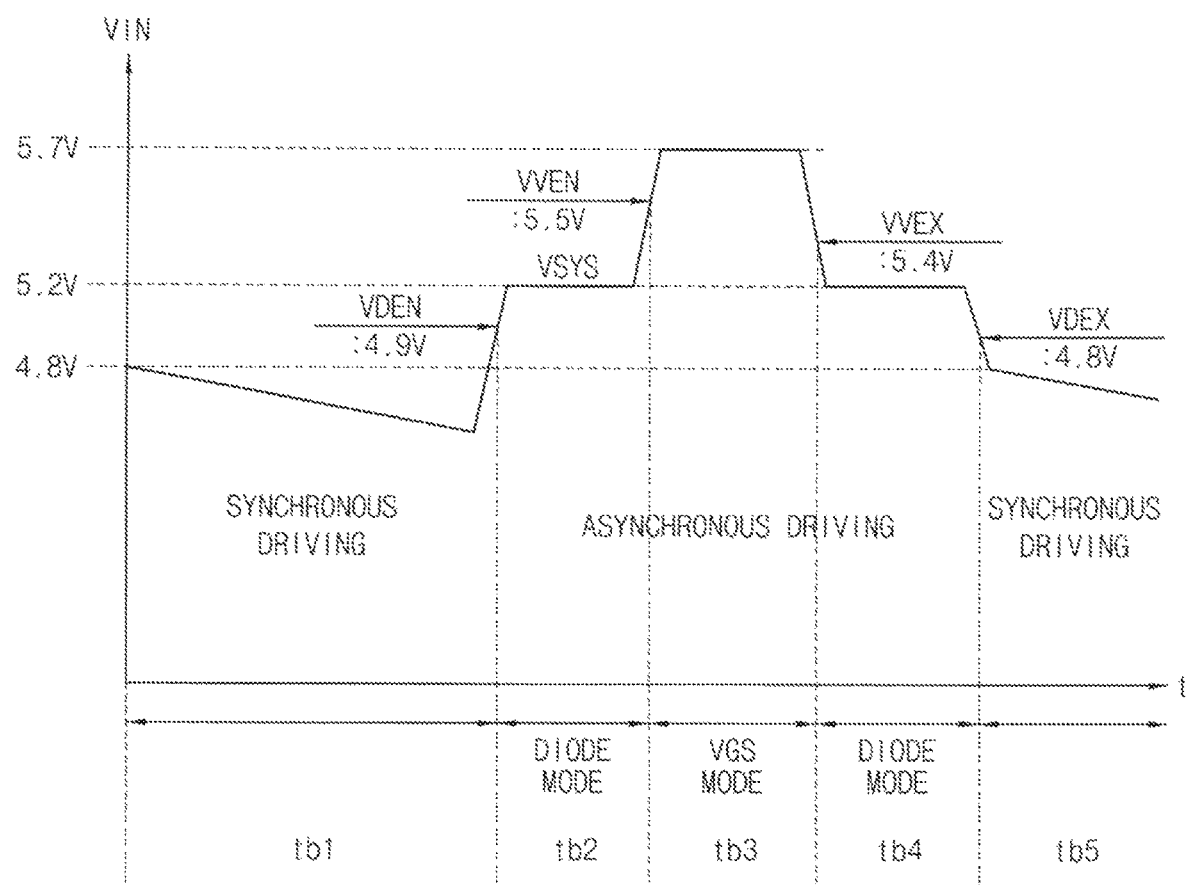
FIG. 12B is a timing diagram illustrating the method of DC-DC converting of FIG. 11 when the output voltage is about 5.0V.

FIG. 11 is a flowchart illustrating a method of DC-DC converting according to an exemplary embodiment of the present inventive concept. FIG. 12A is a timing diagram illustrating the method of DC-DC converting of FIG. 11 when the output voltage is about 4.6V. FIG. 12B is a timing diagram illustrating the method of DC-DC converting of FIG. 11 when the output voltage is about 5.0V.

Referring to FIGS. 1 through 7B and 11 through 12B, the display apparatus may include a display panel 100, a timing controller 200, a scan driver 300, a data driver 400, and a power generating unit (e.g., a power generator) 500.

The power generating unit 500 may include a power controller 520 and a DC-DC converter 540. The power controller 520 may include a charging block 522.

The DC-DC converter 540 may include a first converting part (e.g., a first converter) 542 and a second converting part (e.g., a second converter) 544. The first converting part 542 may generate the first power voltage ELVDD based on the input voltage VIN. The second converting part 544 may generate the second power voltage ELVSS based on the input voltage VIN.

The first converting part 542 includes a first switching element (e.g., a first switch or a first switching transistor) M1, a second switching element (e.g., a second switch or a second switching transistor) M2, a mode selecting circuit MSC, and a controller PC. The first converting part 542 may further include an inductor L1, a first diode D1, a second diode D2, a comparator CP, an output capacitor C2, and a feedback circuit.

The mode selecting circuit MSC includes a reference voltage generating part (e.g., a reference voltage generator) VG and a mode selector MS. The reference voltage generating part VG receives the input voltage VIN and generates a plurality of reference voltages VDEN, VDEX, VVEN, and VVEX. The reference voltages VDEN, VDEX, VVEN, and VVEX are used to determine a converting mode SELMODE of the first converting part 542.

The input voltage VIN, the first reference voltage VDEN, the second reference voltage VDEX, the third reference voltage VVEN, and the fourth reference voltage VVEX are inputted to the mode selector MS. The mode selector MS compares the input voltage VIN to each of the first reference voltage VDEN, the second reference voltage VDEX, the third reference voltage VVEN, and the fourth reference voltage VVEX, to output the converting mode SELMODE.

When the input voltage VIN increases to be equal to or greater than the first reference voltage VDEN from below the first reference voltage VDEN (e.g., from ta1 to ta2 in FIG. 12A and from tb1 to tb2 in FIG. 12B), the mode selector MS changes the converting mode SELMODE from the first mode to the second mode. The first reference voltage VDEN may be referred to as an entering threshold voltage of the second mode The first mode may be a synchronous mode. In the first mode, the first switching element M1 may be repeatedly turned on and off in response to a first switching control signal CONS1, and the second switching element M2 may be repeatedly turned on and off in response to a second switching control signal CONS2.

The second mode may be an asynchronous mode. In the second mode, the first switching element M1 may be repeatedly turned on and off in response to the first switching control signal CONS1, and the second switching element M2 may maintain a turned off status in response to the second switching control signal CONS2.

In FIGS. 11 and 12A, for example, the output voltage ELVDD is 4.6V. In FIGS. 11 and 12A, for example, the first reference voltage VDEN is 4.5V. When the input voltage VIN is close to the output voltage, the minimum on duty is not enough to generate the output voltage, so that the first converting mode 542 may not be able to operate in the first mode.

In FIG. 12B, for example, the output voltage ELVDD is 5.0V. In FIG. 12B, for example, the first reference voltage VDEN is 4.9V.

When the input voltage VIN increases to be equal to or greater than the third reference voltage VVEN from below the third reference voltage VVEN (e.g., from ta2 to ta3 in FIG. 12A and from tb2 to tb3 in FIG. 12B), the mode selector MS changes the converting mode SELMODE from the second mode to the third mode. The third reference voltage VVEN may be referred to as an entering threshold voltage of the third mode.

The third mode may be an asynchronous VGS mode. In the third mode, the first switching element M1 may be repeatedly turned on and off in response to the first switching control signal CONS1, and the second switching element M2 may maintain a turned on status in response to the second switching control signal CONS2. In the third mode, the input voltage VIN is applied to the control electrode of the second switching element M2.

In FIGS. 11 and 12A, for example, the output voltage ELVDD is 4.6V. In FIGS. 11 and 12A, for example, the third reference voltage VDEN is 5.1V. The forward drop voltage Vf of the second diode D2 may be about 0.5V. When the input voltage VIN is close to the sum of the output voltage and the forward drop voltage Vf of the second diode D2, the minimum on duty is not enough to generate the output voltage, so that the first converting mode 542 may not be able to operate in the second mode.

In FIG. 12B, for example, the output voltage ELVDD is 5.0V. In FIG. 12B, for example, the third reference voltage VDEN is 5.5V.

When the input voltage VIN decreases to be less than the fourth reference voltage VVEX from above the fourth reference voltage VVEX (e.g., from ta3 to ta4 in FIG. 12A and from tb3 to tb4 in FIG. 12B), the mode selector MS changes the converting mode SELMODE from the third mode to the second mode. The fourth reference voltage VVEX may be referred to as an exiting threshold voltage of the third mode.

In FIGS. 11 and 12A, for example, the output voltage ELVDD is 4.6V. In FIGS. 11 and 12A, for example, the fourth reference voltage VVEX is 5.0V.

In FIG. 12B, for example, the output voltage ELVDD is 5.0V. In FIG. 12B, for example, the fourth reference voltage VVEX is 5.4V.

The fourth reference voltage VVEX is set to be different from the third reference voltage VVEN, so that the converting mode is prevented or substantially prevented from repeatedly changing at or near the threshold voltage.

When the input voltage VIN decreases to be less than the second reference voltage VDEX from above the second reference voltage VDEX (e.g., from ta4 to ta5 in FIG. 12A and from tb4 to tb5 in FIG. 12B), the mode selector MS changes the converting mode SELMODE from the second mode to the first mode. The second reference voltage VDEX may be referred to as an exiting threshold voltage of the second mode.

In FIGS. 11 and 12A, for example, the output voltage ELVDD is 4.6V. In FIGS. 11 and 12A, for example, the second reference voltage VDEX is 4.4V.

In FIG. 12B, for example, the output voltage ELVDD is 5.0V. In FIG. 12B, for example, the second reference voltage VDEX is 4.8V.

The second reference voltage VDEX is set to be different from the first reference voltage VDEN, so that the converting mode is prevented or substantially prevented from repeatedly changing at or near the threshold voltage.

According to one or more exemplary embodiments, the controller PC determines the mode of the first converting part 542 from among one of the synchronous mode, the asynchronous diode mode, and the asynchronous VGS mode according to a level of the input voltage VIN, so that the DC-DC converter may stably generate the output voltage ELVDD, even when the input voltage VIN is greater than the output voltage ELVDD.

In addition, an entering threshold voltage and an exiting threshold voltage of each of the converting modes are set differently from each other, so that the converting mode may not repetitively change at or near the threshold voltage.

The present inventive concept may be applicable to any system including a display apparatus. For example, the present inventive concept may be applied to a television, a laptop computer, a digital camera, a cellular phone, a smart phone, a personal digital assistant (PDA), a portable multimedia player (PMP), a MP3 player, a navigation system, a video phone, etc.

The electronic or electric devices (e.g., the timing controller, the PWM controller, the mode detector, the comparator, etc.) and/or any other relevant devices or components according to embodiments of the inventive concept described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the inventive concept.

The foregoing is illustrative of aspects and features of the present inventive concept, and is not to be construed as limiting thereof. Although exemplary embodiments of the present inventive concept have been described, those skilled in the art should readily appreciate that various modifications are possible, without materially departing from the spirit and scope of the present inventive concept. Accordingly, all such modifications are intended to be included within the scope of the present inventive concept as defined in the claims, and their equivalents. In the claims, means-plus-function clauses, if any, are intended to cover the structures described herein as performing the recited function, and not only structural equivalents, but also equivalent structures. Therefore, it is to be understood that the foregoing is illustrative of the present inventive concept, and is not to be construed as limited to the specific exemplary embodiments disclosed, and that modifications to the disclosed exemplary embodiments, as well as other exemplary embodiments, are intended to be included within the spirit and scope of the appended claims, and their equivalents. The present inventive concept is defined by the following claims, with equivalents of the claims to be included therein.

What is claimed is:

1. A DC-DC converter comprising:
   a first switch;
   a second switch connected to the first switch;
   an input terminal for receiving an input voltage;
   an output terminal for outputting an output voltage;
   an inductor;
   a mode selecting circuit configured to select a converting mode from one of at least a first converting mode and a second converting mode based on the input voltage; and
   a controller configured to generate a first switching control signal for controlling the first switch based on the selected converting mode, and a second switching control signal for controlling the second switch based on the selected converting mode,
   wherein the mode selecting circuit is configured to select the converting mode from one of at least the first converting mode, the second converting mode, and a third converting mode,
   wherein, in the first converting mode, the first switch is configured to be repeatedly turned on and off in response to the first switching control signal, and the second switch is configured to be repeatedly turned on and off in response to the second switching control signal,
   wherein, in the second converting mode, the first switch is configured to be repeatedly turned on and off in response to the first switching control signal, and the second switch is configured to maintain a turned off state in response to the second switching control signal,
   wherein, in the third converting mode, the first switch is configured to be repeatedly turned on and off in response to the first switching control signal, and the second switch is configured to maintain a turned on state in response to the second switching control signal, wherein in the third converting mode, the second switching control signal is the input voltage, wherein the second switch is coupled between one end of the first switch and the output terminal, and wherein the inductor is coupled between the input terminal and the first and second switches.

2. The DC-DC converter of claim 1, wherein the mode selecting circuit is configured to change the converting mode from the first converting mode to the second converting mode when the input voltage increases from below a first reference voltage to be equal to or greater than the first reference voltage.

3. The DC-DC converter of claim 2, wherein the mode selecting circuit is configured to change the converting mode from the second converting mode to the first converting mode when the input voltage decreases from above a second reference voltage to be less than the second reference voltage, and wherein the second reference voltage has a level different from that of the first reference voltage.

4. The DC-DC converter of claim 3, wherein the mode selecting circuit is configured to change the converting mode from the second converting mode to the third converting mode when the input voltage increases from below a third reference voltage to be equal to or greater than the third reference voltage, and wherein the third reference voltage has a level that is greater than that of the first reference voltage.

5. The DC-DC converter of claim 4, wherein the mode selecting circuit is configured to change the converting mode from the third converting mode to the second converting mode when the input voltage decreases from above a fourth reference voltage to be less than the fourth reference voltage, and wherein the fourth reference voltage has a level that is greater than that of the second reference voltage, and is different from that of the third reference voltage.

6. The DC-DC converter of claim 1, wherein the DC-DC converter is configured to output the output voltage in a current mode of a continuous conduction mode when the selected converting mode is the first converting mode, and wherein the DC-DC converter is configured to output the output voltage in the current mode of one of a pulse skip mode, a discontinuous conduction mode, and the continuous conduction mode, when the selected converting mode is the second converting mode.

7. The DC-DC converter of claim 6, further comprising an adaptive loader circuit, wherein the adaptive loader circuit is configured to sequentially change the current mode from the pulse skip mode to the discontinuous conduction mode, and to then change the current mode from the discontinuous conduction mode to the continuous conduction mode, when the converting mode is changed from an asynchronous mode as the second converting mode to a synchronous mode as the first converting mode, and when the current mode is the pulse skip mode.

8. The DC-DC converter of claim 7, wherein the adaptive loader circuit comprises a third switch, a load resistor connected to the third switch, and a mode detector configured to control switching of the third switch, wherein the third switch is configured to be turned on so that the current mode is sequentially changed from the pulse skip mode to the discontinuous conduction mode when the converting mode is changed from the asynchronous mode to the synchronous mode, and when the current mode is the pulse skip mode, and wherein the third switch is configured to be turned off when the converting mode is the synchronous mode.

* * * * *